April 24, 1934.  P. KLEIN ET AL  1,956,293
PROCESS OF AND APPARATUS FOR PRODUCING LIQUID DISPERSIONS
Filed Feb. 21, 1928  3 Sheets-Sheet 1
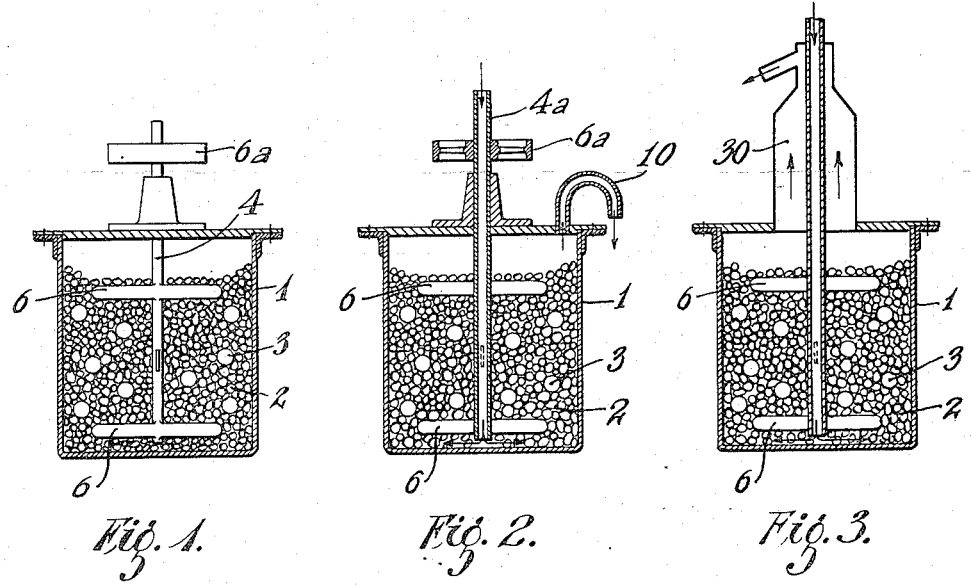
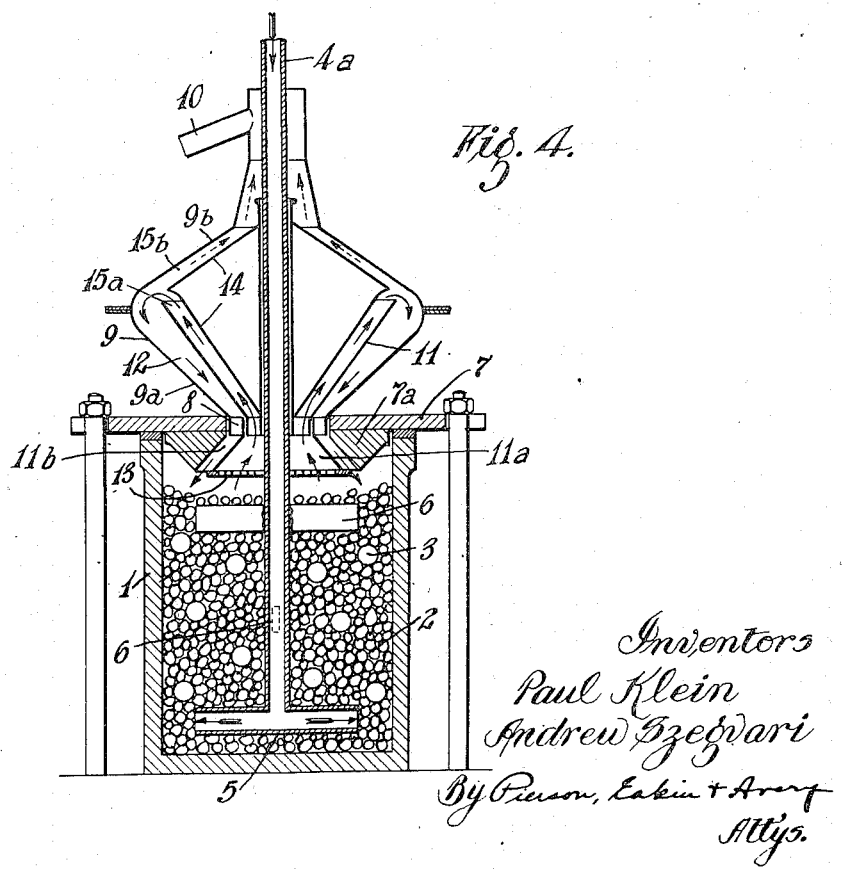
Inventors
Paul Klein
Andrew Szegvari
By Pierson, Eakin & Avery
Attys.

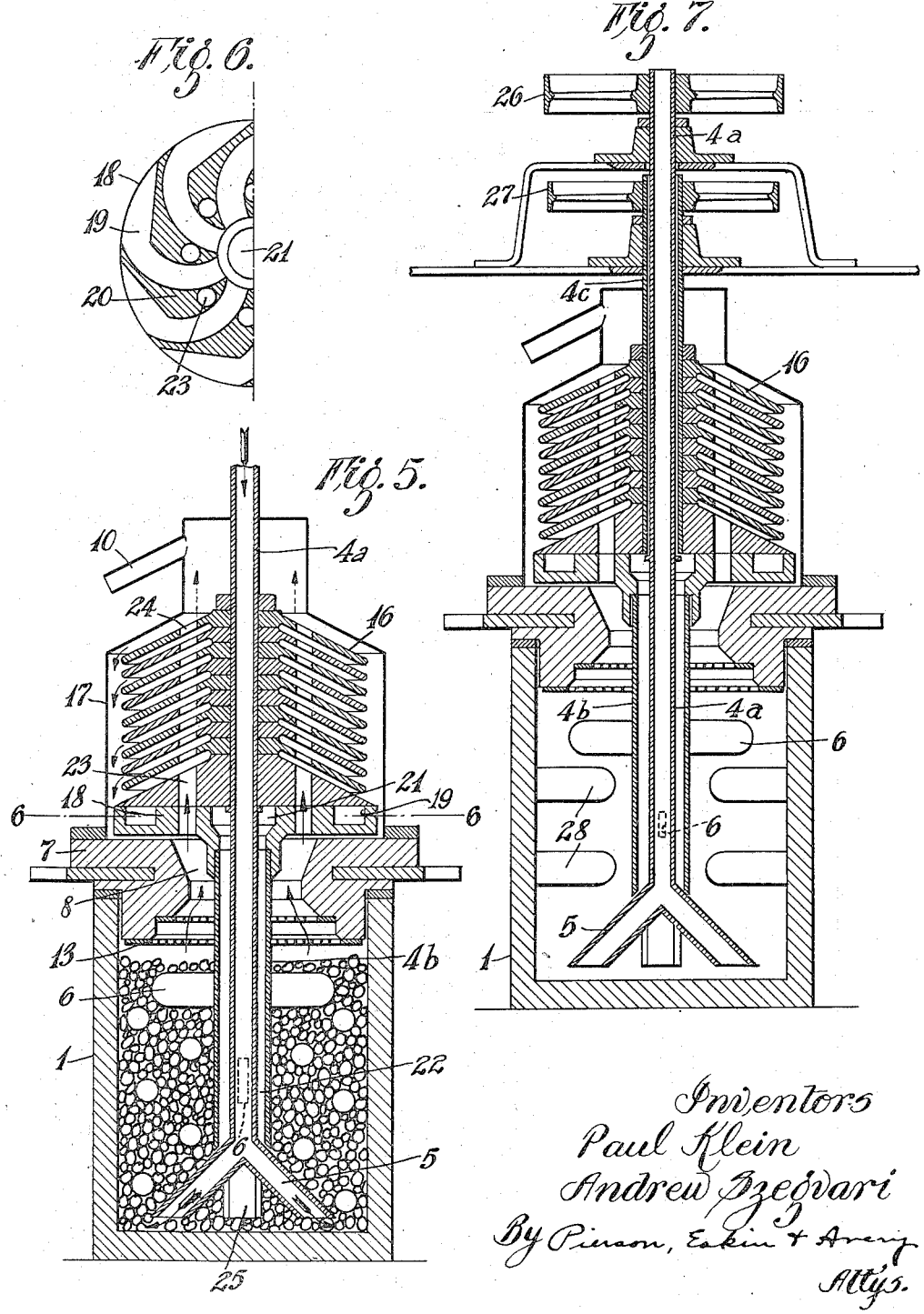

Patented Apr. 24, 1934

1,956,293

UNITED STATES PATENT OFFICE 1,956,293

PROCESS OF AND APPARATUS FOR PRODUCING LIQUID DISPERSIONS

Paul Klein, Budapest, Hungary, and Andrew Szegvári, Akron, Ohio, assignors to American Anode Inc., Akron, Ohio Application February 21, 1928, Serial No. 255,939
In Germany February 23, 1927

6 Claims. (Cl. 252—6)

This invention relates to a process of producing liquid dispersions and to apparatus for carrying out said process.

Hitherto it has only been possible to carry out the known processes for producing dispersions of substances in liquids in which they are sparingly soluble or practically insoluble by grinding said substances to a colloidal condition, with expensive plant requiring a considerable expenditure of power, so that for many industries the production of colloidal dispersions on a large scale, by grinding, is out of the question.

The present invention enables dispersions up to colloidal fineness to be produced by grinding with very simple means and with moderate expenditure in power.

The material to be treated by the new process should preferably already be in as finely a subdivided state as possible, which can be obtained in a known manner, for instance by grinding in the usual mills or by any other treatment such as, for example precipitation, sublimation, sedimentation or the like.

According to the process of the present invention, the finely sub-divided material or materials to be dispersed is or are suspended in the dispersion liquid, if desired admixed with a protective colloid or with substances adapted to promote dispersion and is subjected to the action of rounded off hard grinding elements maintained in relative movement by means of a stirring device until the desired degree of dispersion has been attained. The fine dispersion may thereupon be separated from the coarser particles by means of known separating processes, for instance, by sedimentation.

Quartz stones, flint stones or the like which preferably pass through a sieve of not more than 8 mm. mesh, but which remain on a sieve of not less than 1 mm. mesh may advantageously be employed as grinding bodies.

In order to increase the efficiency of the process it has been found preferable to mix the small grinding bodies with hard balls, of for example porcelain, of a greater diameter than the diameter of the mesh of the larger sieve.

However, we wish it to be understood that the invention is not intended to be restricted to the use of these dimensions.

In order to avoid coagulation by metallic ions, the metal parts of the mill may be provided with a non-metallic coating, of for example rubber.

The apparatus for carrying out the process, i. e. the mill, can be constructed for intermittent as well as for continuous operation.

It is also possible to provide means for continuously sub-dividing the material to be dispersed into two or more fractions which differ in the size of the dispersed particles. The fraction containing the finer particles may be continuously obtained by overflow, while the fraction containing the coarser particles may preferably be returned into the mill.

In order to separate the various fractions, sedimentation processes or centrifugal force may, for example, be resorted to; nevertheless we wish it to be understood that the invention is not restricted to these means of separation.

In order to understand the invention more clearly, reference is made to the accompanying drawings which illustrate by way of example several embodiments of apparatus suitable for carrying out the invention.

Fig. 1 is a vertical section of a mill for intermittent operation.

Fig. 2 is a vertical section of a mill for continuous operation without special devices for separating the overflow into fractions.

Fig. 3 is a vertical section of a mill for intermittent operation with separation by sedimentation.

Fig. 4 is a vertical section of the most simple embodiment of a continuously working mill with centrifugal separation.

Fig. 5 is a vertical section of a mill with a multiple centrifugal separator.

Fig. 6 is a cross section along the lines 6—6 of Figure 5.

Fig. 7 is a vertical section of a mill in which the centrifugal separator is driven independently of the mill.

Figure 8:
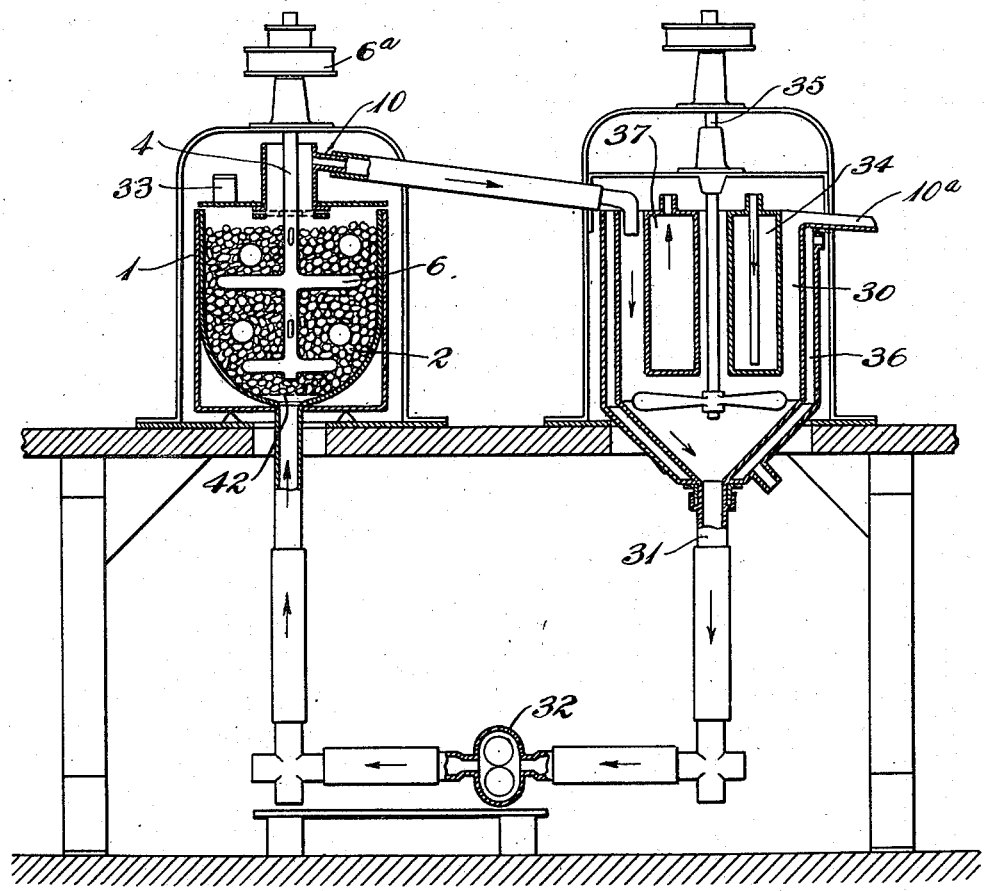
Fig. 8 is a vertical section of a mill with an external circulating and cooling device.

In the embodiment illustrated in Fig. 1, the mill consists of an upright stationary receptacle 1, for example of earthenware or porcelain or of metal having an integral non-metallic coating, such as of rubber. The receptacle is filled with quartz stones or flints 2 or the like of a size up to about 2 to 6 mm. among which are distributed grinding bodies larger in size, for example hard porcelain balls 3 of a size of about 10 to 30 mm. A shaft 4, driven by the pulley 6a and provided with stirrer arms 6, is rotatably mounted in the cover of the receptacle 1.

Fig. 2 shows the same mill with the modification that the material to be ground is continuously admitted in the direction of the arrow through the hollow shaft 4a to the bottom of the grinding space. The ground material is continuously removed through the discharge opening or tube 10 provided at the top of the receptacle 1.

In the embodiment illustrated in Fig. 3 the ground material is, prior to its discharge, passed through a sedimentation zone 30, in which insufficiently disintegrated particles are separated out and returned to the grinding chamber 1.

In the embodiment illustrated in Fig. 4, a rotatably mounted vertical stirrer shaft 4a driven by pulleys or other means (not shown) is provided with a number of stirrer arms 5 and 6 and extends into the receptacle 1. The shaft 4a and the lowest stirrer arms 5 are hollow. The receptacle 1 is closed by a lid 7 provided with an opening 8. A casing 9 is arranged upon and communicating with said opening 8 of the lid, said casing consisting of a funnel shaped part 9a, an inverted funnel shaped part 9b superimposed on part 9a and having an overflow 10. A second funnel shaped part 11 is coaxially and concentrically arranged within the funnel shaped lower part 9a of the casing 9 in such a way that a funnel shaped annular passage 12 is formed between the walls 9a and 11, which leads to the opening 8 of the lid. This second funnel 11 is at its lower end connected to an inverted funnel 11a disposed below the opening 8 and provided with a perforated bottom 13. The lid 7 may be provided with an annular part 7a having an inner conical surface corresponding substantially to the inverted funnel 11a so as to form an annular passage 11b. A double cone 14 mounted on the shaft 4a is coaxially and concentrically arranged within said second funnel shaped part 11 in such a way that annular passages 15a and 15b are provided between the walls of the double cone 14 and the interposed funnel 11 on the one hand and between the upper part of the double cone 14 and the walls of the funnel 9b of the casing 9.

The apparatus operates in the following manner:—

The material to be ground, which is already disintegrated and suspended in the dispersion liquid, is continuously introduced through the hollow shaft 4a and enters the mill in the direction of the feathered arrow, through the hollow stirrer arm 5. The stirrer arms 5 and 6 stir up the sludge with the grinding bodies 2 and balls 3, the finer particles of the material passing with the liquid through the perforated bottom 13 and through the annular passage 15a along the rotating double cone 14. This rotating cone imparts a rotary motion to the liquid by virtue of friction, and at the point of the greatest diameter of the double cone 14, the coarser particles are separated out by centrifugal force, and are returned to the receptacle in the direction of the plain arrows though the annular passage 12, while the liquid with the finest dispersion ascends in the direction of the dotted arrows between the rotating double cone 14 and the upper part 9b of the casing through the annular passage 15b and is discharged from the mill through the overflow 10.

The embodiment shown in Figs. 5 and 6 differs from that shown in Fig. 4 by the provision of a separator consisting of a number of superimposed discs 16 and by the provision of means whereby coarse sludge collecting at the bottom of the casing 17 of the centrifugal separator may be automatically returned by means of a bucket wheel 18 shown in Fig. 6. The sludge passing through the bucket wheel 18 and passages 19 between the buckets 20 is conveyed by the buckets in a radial direction towards the central opening 21 of the bucket wheel.

The stirrer shaft consists of two tubes 4a and 4b which are coaxially arranged in such a manner that an annular space 22 is provided between the two tubes. The interior of the lower stirrer arms 5 is in communication with the interior of the inner tube 4a and the stirrer arms 5 pass through the wall of the outer tube 4b. The outer tube 4b carries stirrer arms 6 as well as the bucket wheel 18 while the stirrer arms 5 and the discs of the centrifugal separator 16 are mounted upon the inner tube 4a. Channels 23 are provided in the bucket wheel 18 leading from the central opening 8 of the lid 7 near the axis of rotation to the perforations 24 in the disc 16 of the centrifugal separator. The perforated double bottom 13 separating the grinding chamber from the centrifugal separator is mounted on the lid 7.

The sludge to be ground is introduced into the mill through the inner tube 4a in the direction of the feathered arrow and passes through the lower stirrer arms 5 into the mill. The dispersion leaving the mill passes through the opening 8 of the lid and through the channels 23 into the centrifugal separator and from thence ascends through the channels 24. Separation of the coarser particles is effected between the individual discs 16, the coarser particles descending near the periphery of the casing 17. The coarser sludge is caught up by the bucket wheel 18 and is returned through the annular passage 22 between the tubes 4a, 4b. The coarser particles returning to the grinding space issue thereinto through the lower outlet 25 of the tube 4b, while the finer dispersion is discharged from the mill through the overflow 10.

The mill illustrated in Fig. 7 differs from that shown in Fig. 5 only by the discs 16 of the centrifugal separator being mounted on a separate tube 4c surrounding the tube 4a. Consequently the centrifugal separator can be driven by means of the separate pulley 27 mounted upon the outer tube 4c at a higher speed than the stirrer arms 5, 6 of the mill mounted upon the inner tube 4a and driven by the pulley 26.

In all the modifications illustrated, stationary arms such as 28 (Fig. 7) may be provided in the mill to ensure a more thorough disintegration and a better dispersion effect.

Moreover in all the hereinbefore described embodiments of the dispersion mill it is sometimes advantageous to provide a cooling device for the purpose of maintaining the temperature of the material to be ground as low as possible during the grinding process for the purpose of avoiding coagulation of the already dispersed particles. The cooling may be effected in any known manner, for example by cooling coils, cooling jackets or the like.

In the embodiment illustrated in Figure 4 the cooling of the dispersion may be effected by the extensive surface of the external cone 9a. In the embodiment, illustrated in Figure 8, cooling of the dispersion is effected by circulating cooling liquids through jackets 34 and 36. The sedimentation chamber or zone which according to Figure 3 is disposed at the top of the grinding chamber is arranged, according to Figure 8, as a separate vessel 30 into which the overflow is conducted from the discharge opening 10 of the grinding chamber. The bottom of the sedimentation vessel 30 is connected by a return conduit 31 with the bottom of the grinding chamber 1. A pump 32 inserted in the return conduit 31 maintains the liquid containing the sludge in circulation. The suspension to be ground is forced by the pump 32 in the direction of the arrows upwards and enters the grinding chamber 1 at the bottom through the perforated plate 42, on which the grinding bodies rest. The suspension leaves the grinding chamber 1 through the outlet 10 and enters the sedimentation vessel 30, the coarser particles sinking down and being returned into the grinding chamber. In continuous working of the apparatus the finest dispersion leaves the sedimentation vessel 30 at the discharge outlet 10a while the primary sludge is continuously introduced either at 33 into the grinding chamber 1, or at any other point in the circuit, for example into the sedimentation vessel 30. A stirring device 35 may be provided if necessary. Cooling liquid is circulated through the external jacket 36 and through the internal jacket 34 so that the dispersion leaving the grinding chamber receptacle is cooled before being returned thereto.

It is also possible to mount the receptacle containing the grinding stones rotatably and to drive the receptacle. The axis of the receptacle may be coaxial with the axis of the stirrer arms or it may be arranged eccentrically. It is also possible to arrange the rotating shaft with the agitating arms at an angle to the axis of the receptacle.

Having now particularly described and ascertained the nature of our said invention and in what manner the same is to be performed, we declare that what we claim is:—

1. A method of producing a fine or colloidal dispersion of a solid substance in a liquid in which the substance is practically insoluble, which comprises subjecting a suspension of the substance in the liquid in the presence of a protective colloid to the rubbing or attrition, as opposed to either impact or rolling, of hard, rounded grinding elements maintained in random relative motion.

2. A method of producing a fine or colloidal dispersion of a solid substance in a liquid in which the substance is practically insoluble, which comprises suspending the substance in the liquid in the presence of a protective colloid, and subjecting the suspension to the rubbing or attrition, as opposed to either impact or rolling, of hard, rounded grinding elements maintained in random relative motion, until a dispersion of the desired degree of fineness is produced.

3. A method of producing a fine or colloidal dispersion of a solid substance in a liquid in which the substance is practically insoluble, which comprises adding a protective colloid and the substance in a finely divided form to the liquid, and subjecting the mixture to the rubbing or attrition, as opposed to either impact or rolling, of hard, rounded grinding elements maintained in random relative motion by a stirring operation.

4. A method of producing a fine or colloidal dispersion of a solid substance in a liquid in which the substance is practically insoluble, which comprises adding a protective colloid and the substance in a finely divided form to the liquid, and subjecting the mixture to the rubbing or attrition, as opposed to either impact or rolling, of a mixture of relatively small and relatively large hard, rounded grinding elements maintained in random relative motion by a stirring operation, until a dispersion of the desired degree of fineness is produced.

5. A method of producing a fine or colloidal dispersion of a solid substance in a liquid in which the substance is practically insoluble, which comprises subjecting a suspension of the substance in the liquid in the presence of a protective colloid to the rubbing or attrition, as opposed to either impact or rolling, of hard, rounded grinding elements which will pass through a sieve of 8 mm. mesh but are retained by a sieve of 1 mm. mesh, maintained in random relative motion.

6. A method of producing a fine or colloidal dispersion of a solid substance in a liquid in which the substance is practically insoluble, which comprises adding a protective colloid and the substance in a finely divided form to the liquid, and subjecting the mixture to the rubbing or attrition, as opposed to either impact or rolling, of hard, rounded grinding elements which will pass through a sieve of 8 mm. mesh but are retained by a sieve of 1 mm. mesh, by stirring the grinding elements while immersed in the mixture.

PAUL KLEIN.
ANDREW SZEGVÁRI.